J. HOLLENBACK.
ANIMAL TRAP.
APPLICATION FILED JAN. 6, 1910.
968,946.
Patented Aug. 30, 1910.
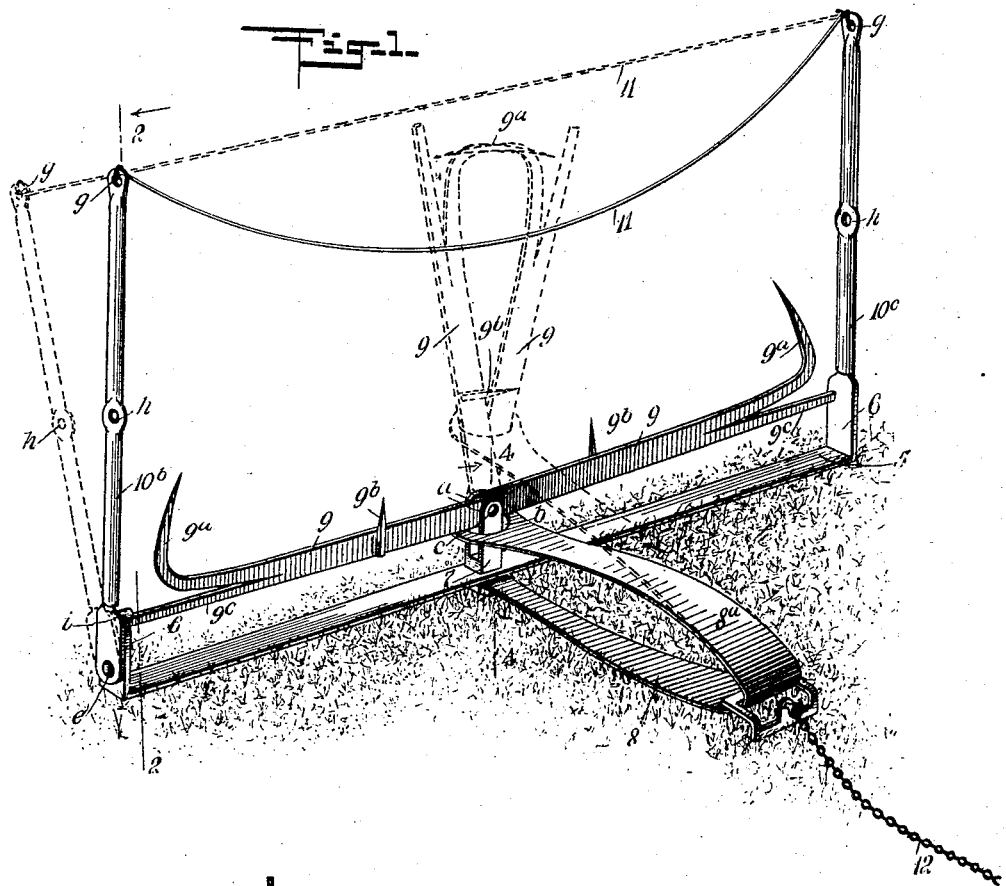
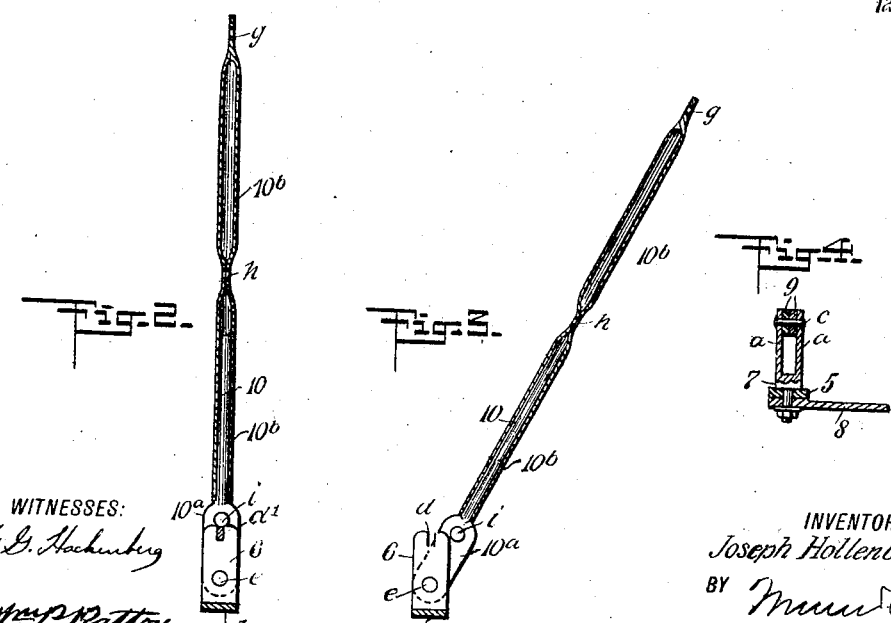
WITNESSES:
INVENTOR
Joseph Hollenback
BY
ATTORNEYS

UNITED STATES PATENT OFFICE.

JOSEPH HOLLENBACK, OF BOISE, IDAHO.

ANIMAL-TRAP.

968,946. Specification of Letters Patent. Patented Aug. 30, 1910.

Application filed January 6, 1910. Serial No. 536,600.

*To all whom it may concern:*

Be it known that I, JOSEPH HOLLENBACK, a citizen of the United States, and a resident of Boise city, in the county of Ada and State of Idaho, have invented a new and Improved Animal-Trap, of which the following is a full, clear, and exact description.

This invention relates to a type of traps that are adapted to catch wild animals by grasping them when the "set" trap is sprung, by contact of the animal with a part of the trap when passing over it.

The purpose of the invention is to provide novel details of construction for a trap of the character indicated, which render it very reliable, and adapt it to grasp and hold large or small animals with equal certainty upon an attempt being made by an animal to walk or crawl over the "set" trap.

The invention consists in the novel construction of parts as is hereinafter described and defined in the appended claims.

Reference is to be had to the accompanying drawings forming a part of this specification, in which similar characters of reference indicate corresponding parts in all the views.

Figure 1 is a perspective view of a trap embodying details of the invention that are adjusted for catching an animal; Fig. 2 is a transverse sectional view of a base plate, a vertical longitudinal sectional view of a trigger arm rockable thereon, and a transverse sectional view of a gripping jaw, the sections being taken substantially on the line 2—2 in Fig. 1; Fig. 3 is a transverse sectional view of the base plate and a longitudinal sectional view of a trigger arm thereon, showing the latter rocked into an inclined position, and Fig. 4 is a transverse sectional view of operative details, taken substantially on the line 4—4 in Fig. 1 the upper member of the bowed spring being removed.

In the drawings, 5 indicates a base plate for the trap, whereon other parts are arranged in relative positions for coöperative service, said base plate consisting of an elongated flat plate of suitable metal having similar integral flat arms 6, 6 formed on its ends, that project therefrom vertically as appears in Fig. 1.

Centrally on the base plate 5, a swivel block 7 is pivoted by its lower end, and upon said end one end of a bowed spring 8 is likewise loosely secured, this end portion of the spring being lapped upon the lower side of the base plate, as is best shown in Fig. 4. The upper portion of the swivel block 7 is vertically slotted, affording two spaced members $a$, $a$ therefor that are parallel with each other.

The upper limb $8^a$ of the bowed spring 8 extends toward the upper portion of the swivel block 7, and in the end of said limb an opening $b$ is formed, wherein the swivel block members $a$, $a$, are loosely inserted upwardly. Two similar gripping jaws 9, 9, are provided, each consisting of a flat metal bar, having a pointed hook $9^a$ on the outer end thereof, and a sharpened prong $9^b$ formed or secured at a proper distance from the hook $9^a$. The remaining ends of the gripping jaws 9 are laterally and oppositely perforated and lapped together, said ends being inserted between the members $a$, $a$, of the swivel block 7 and pivoted thereon, thus adapting the gripping jaws to rock on their pivot $c$, toward the arms 6, 6, on the base plate 5, or toward each other, and it will be noted that the upper member $8^a$ of the bowed spring 8 bears forcibly upon the lower edges of the gripping jaws 9, and if free to do so, exerts tensional force for the instant closure of said jaws, as shown by dotted lines in Fig. 1.

Upon each of the free ends of the gripping jaws 9, 9, a detent finger $9^c$ is formed, that extends beyond an adjacent hook $9^a$, one of said fingers, as indicated at the right in Fig. 1, having frictional contact with one upright arm 6 when the gripping jaws are disposed horizontally. In the upper end of the other arm 6, a notch $d$ is formed, which will loosely receive the extremity $d'$, of the remaining detent finger $9^c$, when the trap is set.

A trigger arm is provided for detachably retaining a respective gripping jaw 9, disposed in a horizontal position, this arm being positioned at the left in Fig. 1, and constructed as follows: On a flat stub-end $10^a$ a cylindrical member 10 is formed, said stub-end being pivoted as at $e$ upon a corresponding upright arm 6, thus adapting the member 10 to receive rocking adjustment thereon. An extension piece $10^b$ is formed of tubing and is loosely mounted on the member 10. On the other upright arm 6 a cylindrical trigger arm $10^c$ is formed or secured, which may be tubular and is of the same dimensions as the extension piece $10^b$;

and it will be seen in Fig. 1 that the trigger arms are disposed parallel with each other when both are upright. By forming the trigger arms hollow they are given a desired length without excessive weight. Each tubular member $10^b$, $10^c$, of a trigger arm is flattened at the normally upper end thereof, and said ends $g$ are laterally perforated, forming similar eyes thereon. Another eye $h$ is formed on each trigger arm $10^b$, $10^c$, near its center of length by flattening the body and then laterally perforating it.

Near the upper end of the stub end $10^a$, a keeper stud $i$ is laterally projected therefrom, which is disposed in loose contact with the upper edge of the respective extremity $d'$ on a detent finger $9^c$, when said finger is rocked into the adjacent notch $d$, and it will be noted that if the gripping jaws 9, 9, are rocked outward into a horizontal position, as shown by full lines in Fig. 1 and both trigger arms are disposed vertically, the keeper stud $i$ will be located above and in contact with the end $d'$ of the gripping jaw member that is horizontally positioned, and this engagement of the stud $i$ with the end $d'$ will retain the latter within the notch $d$ until the detent fingers $9^c$ are rocked on their pivots, whereupon the stud $i$ will be displaced from the end $d'$ and the force of the spring 8 will close the gripping jaws 9, 9, as shown by dotted lines in Fig. 1.

To adapt the trap for service, if it is to be used for the capture of wolves, coyotes, foxes or other large wild animals, a tripping cord 11 or thin chain is extended between the upper ends of the extension pieces $10^b$, $10^c$, by connecting the ends of said cord or the like to the eyes $g$, which will dispose the cord a proper distance above the opened jaws of the trap. The bowed end of the spring 8 is connected to an end of a stout chain 12, and the latter is at the remaining end thereof secured to a tree body or other fixed object, and the trap may be concealed with grass strewn over it.

It will be evident that if the trap is set in a path or "run-way" that is traversed by wild animals, and such a beast attempts to cross the line or cord 11, the height of the latter will cause it to receive the impact of the running animal, and the trap jaws will be sprung in an obvious manner, so as to grip the animal and hold it secured. If the trap is set for smaller game, such as minks or rabbits, a second cord should be attached by its ends to the eyes $h$, so as to dispose the cord nearer to the trap so that the smaller animals will strike against it and spring the trap. When large animals are caught, the hooks $9^a$ will be embedded therein, and by their grip hold the animal from escape and probably kill it, but in case a smaller animal strikes the lower cord $11^a$ and springs the trap, the short prongs $9^b$ only will grip the small animal, or if they do not strike it, the inner edges of the jaws 9, 9, will hold it as their forcible impact will stun the game so that it cannot get free.

If preferred, the short prongs $9^b$, shown on the jaws 9, may be removed.

Having thus described my invention, I claim as new and desire to secure by Letters Patent:

1. A trap, comprising an elongated base plate, upright arms on the ends of said base plate, two gripping jaws having a hook on the outer end of each, the inner ends thereof being lapped and pivoted on an upright support on the base plate, a detent finger on the outer end of each gripping jaw, a trigger arm pivoted at its lower end on one of the arms on the base plate, means carried by the trigger arm for releasably holding one detent finger engaged with said arm on the base plate, and means for rocking said trigger arm when an animal passes over the trap to release the said detent finger, the other detent finger being adapted for frictional contact with the other upright arm on the base piece.

2. A trap, comprising an elongated base plate, an upright arm on each end of said base plate, a forked swivel block pivoted on the base plate at its center, two gripping jaws lapped together at the inner ends and pivoted in the fork of the swivel block, a hook on the outer end of each gripping jaw, a bowed spring adapted for pressing upward on the inner ends of the gripping jaws, a detent finger on the outer end of each gripping jaw below the respective hook thereon, a trigger bar pivoted by the lower end thereof upon the respective upright arm on the base plate, a laterally projected stud on the lower portion of one trigger bar and adapted for contact with the upper side of a corresponding detent finger, and a flexible connection extending between the upper portions of the trigger bars.

3. A trap comprising an elongated flat base plate, an upright flattened arm at each end of the said base plate, one of said arms having a notch in its upper end, a forked swivel block pivoted on the base plate at its center, two gripping jaws lapped together at their inner ends, inserted between the members of the forked swivel block and pivoted thereon, a hook on the outer end of each gripping jaw, a prong on each jaw projected upwardly, a bowed spring secured by one member at its end on the base plate by a depending end of the swivel block, the upper end of the said spring having an opening therein which receives the swivel block and thus is adapted for pressing upon the ends of the gripping jaws, a detent finger on the outer end of each gripping jaw, a trigger bar pivoted by the lower end thereof upon the respective arm of the base plate, a laterally projected stud on the lower portion of one trigger bar, adapted for contact with an end of one detent finger that occupies the notch in the arm on the base plate, and a flexible connection extended between the two trigger bars.

4. In a trap of the character described, the trigger bars, each consisting of a flat stub end, a cylindrical member extended at one end of the stub end, a tubular extension mounted on the cylindrical member, an eye on the upper end of the tubular extension, an eye near the center of said tubular extension, and a stud laterally projected from the stub end.

5. A trap comprising a base plate, an upright arm on one end of the base plate having a notch in its upper end, a trigger arm pivoted to said upright arm, gripping jaws pivoted at their inner ends to a support on the base plate, a spring for actuating said jaws, a detent finger on one of said jaws adapted to engage the notch in the said upright arm on the base plate, a projection on the said trigger arm for releasably holding the detent finger in said notch, and means for rocking the trigger arm when an animal passes over the trap to release said detent finger.

6. In a trap, a base plate having a member provided with a notch, spring controlled gripping jaws pivotally mounted on said base plate, a detent finger on one of said gripping jaws and adapted to engage said notch, trigger arms extending from the ends of the base plate, one of said arms being pivoted and having a member for engagement with the said detent finger to hold the same in said notch, and a flexible connection between the said trigger arms.

In testimony whereof I have signed my name to this specification in the presence of two subscribing witnesses.

JOSEPH HOLLENBACK.

Witnesses:
  FRANK FAWCETT,
  WILLIAM ANTHONY.